(12) United States Patent
Gonze et al.

(10) Patent No.: US 8,713,919 B2
(45) Date of Patent: May 6, 2014

(54) EXHAUST SYSTEM FOR INTERNAL COMBUSTION ENGINE

(75) Inventors: Eugene V. Gonze, Pinckney, MI (US); Michael J. Paratore, Jr., Howell, MI (US); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 240 days.

(21) Appl. No.: 13/296,423

(22) Filed: Nov. 15, 2011

(65) Prior Publication Data

US 2013/0118150 A1 May 16, 2013

(51) Int. Cl.
*F01N 3/00* (2006.01)
*F01N 3/02* (2006.01)
*F01N 3/20* (2006.01)

(52) U.S. Cl.
USPC ............... 60/295; 60/286; 60/287; 60/288; 60/299; 60/301

(58) Field of Classification Search
USPC ................ 60/286, 287, 288, 295, 299, 301
See application file for complete search history.

(56) References Cited

U.S. PATENT DOCUMENTS

| | | | | |
|---|---|---|---|---|
| 5,085,050 A | * | 2/1992 | Katoh | 60/288 |
| 5,331,809 A | * | 7/1994 | Takeshima et al. | 60/288 |
| 5,765,369 A | * | 6/1998 | Tanaka et al. | 60/277 |
| 5,804,147 A | * | 9/1998 | Blanchet et al. | 422/171 |
| 8,245,497 B2 | * | 8/2012 | Yoda et al. | 60/277 |
| 2007/0271908 A1 | * | 11/2007 | Hemingway et al. | 60/286 |
| 2011/0192143 A1 | * | 8/2011 | Andersson et al. | 60/274 |

FOREIGN PATENT DOCUMENTS

WO    WO 2010050857 A1 *  5/2010  ............... F01N 3/08

\* cited by examiner

*Primary Examiner* — Thomas Denion
*Assistant Examiner* — Dapinder Singh
(74) *Attorney, Agent, or Firm* — Cantor Colburn LLP

(57) ABSTRACT

In an exemplary embodiment of the invention an exhaust gas after treatment system for an internal combustion engine comprises an exhaust gas conduit configured to transport exhaust gas from the internal combustion engine to exhaust treatment devices of the exhaust gas treatment system. A controller in signal communication with the exhaust gas aftertreatment system is configured to monitor the temperature of a selective catalytic reduction device, wherein the controller is operable to move a valve assembly to an open position when the selective catalytic reduction device is at or above an operating temperature and to move the valve assembly to a closed position when the selective catalytic reduction device is below the operating temperature for entrainment of NOx constituents from the exhaust gas.

12 Claims, 2 Drawing Sheets

EXHAUST SYSTEM FOR INTERNAL COMBUSTION ENGINE

FIELD OF THE INVENTION

Exemplary embodiments of the invention relate to exhaust gas treatment systems for internal combustion engines and, more particularly, to an efficient system for storing and treating oxides of nitrogen in the exhaust gas system.

BACKGROUND

The exhaust gas emitted from an internal combustion engine is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter. Catalyst compositions, typically disposed on catalyst supports or substrates that are disposed within the exhaust system of an internal combustion engine are provided to convert certain or all of these exhaust gas constituents into non-regulated exhaust gas components. For example, exhaust systems for internal combustion engines may include one or more of a precious metal containing oxidation catalyst ("OC") device for the reduction of CO and excess HC, a selective catalyst reduction catalyst ("SCR") device for the reduction of NOx, an adsorber to capture and store NOx until the SCR device reaches an operational temperature and a particulate filter ("PF") device for the removal of particulate matter from the engine exhaust gas.

As indicated, a technology that has been developed to reduce the levels of NOx emissions in lean-burn engines (ex. diesel and gasoline fueled engines) that burn fuel in excess oxygen includes a selective catalytic reduction ("SCR") device. The SCR catalyst composition may contain a zeolite and one or more base metal components such as iron ("Fe"), cobalt ("Co"), copper ("Cu") or vanadium ("V") which can operate efficiently to convert NOx constituents in the exhaust gas in the presence of a reductant such as ammonia ('$NH_3$"). Although the use of a catalyst aides in the reduction of activation energy that is required for the SCR device to reduce NOx, the ever increasing efficiency of diesel and other lean burn engines results in cooler exhaust temperatures when moderately operated and following engine cold start-up. Such cooler operating temperatures delay the operational start-up of the SCR device, which must reach a minimum operating temperature to effectively reduce NOx. Typically, an SCR may not reach appropriate operating temperatures until several minutes after the engine is started.

SUMMARY OF THE INVENTION

In an exemplary embodiment of the invention an exhaust gas aftertreatment system for an internal combustion engine comprises an exhaust gas conduit configured to transport exhaust gas from the internal combustion engine to exhaust treatment devices of the exhaust gas treatment system, an oxidation catalyst device configured to oxidize unburned gaseous and non-volatile HC and CO in the exhaust gas, a selective catalytic reduction device disposed downstream of the oxidation catalyst device configured to convert NOx constituents in the exhaust gas in the presence of a reductant within an active temperature range and a NOx adsorber assembly disposed upstream of the selective catalytic reduction device, between the selective catalytic reduction device and the oxidation catalyst device. The NOx adsorber assembly comprises a substrate flow passages having an adsorbent compound applied thereto to entrain NOx constituents from the exhaust gas, a bypass and a valve assembly disposed in fluid communication with the bypass. The valve is operable to move from an open position in which exhaust gas flows through the bypass and to the selective catalytic reduction device to a closed position in which exhaust gas is prevented from flowing through the bypass and is forced to flow through flow passages and to the selective catalytic reduction device. A controller in signal communication with the exhaust gas aftertreatment system is configured to monitor the temperature of the selective catalytic reduction device, wherein the controller is operable to move the valve assembly to the open position when the selective catalytic reduction device is at or above an operating temperature and to move the valve assembly to a closed position when the selective catalytic reduction device is below the operating temperature for entrainment of NOx constituents from the exhaust gas.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
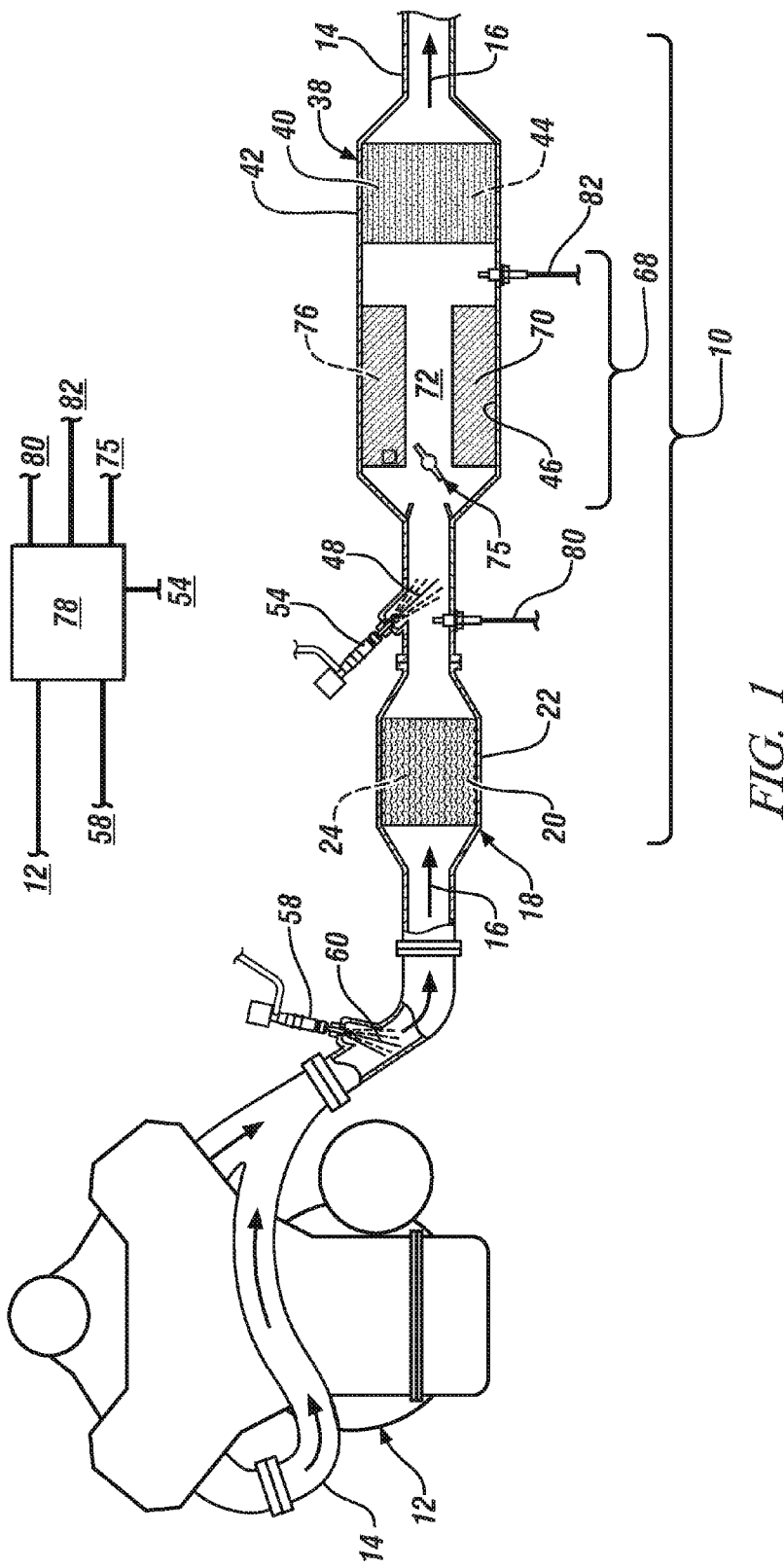
FIG. 1 is a schematic view of an exhaust gas treatment system for an internal combustion engine.

The following description is merely exemplary in nature and is not intended to limit the present disclosure, its application or uses. It should be understood that throughout the drawings, corresponding reference numerals indicate like or corresponding parts and features.

Referring now to FIG. 1, an exemplary embodiment of the invention is directed to an exhaust gas treatment system 10 for the reduction of regulated exhaust gas constituents of an internal combustion engine 12. It is appreciated that the internal combustion engine 12 may include, but is not limited to diesel engine systems, gasoline engine systems and homogeneous charge compression ignition engine systems.

The exhaust gas treatment system includes an exhaust gas conduit 14, which may comprise several segments that function to transport exhaust gas 16 from the internal combustion engine 12 to the various exhaust treatment devices of the exhaust gas treatment system 10. The exhaust treatment devices may include an Oxidation Catalyst ("OC") device 18. In an exemplary embodiment, the OC device 18 includes a flow-through metal or ceramic monolith substrate ("substrate") 20 that is packaged in a rigid shell or canister 22 between an inlet and an outlet that are in fluid communication with the exhaust gas conduit 14 and are configured to facilitate the flow of exhaust gas 16 therethrough. The substrate 20 has an oxidation catalyst compound 24 disposed thereon. The oxidation catalyst compound 24 may be applied as a wash coat and may contain platinum group metals such as platinum (Pt), palladium (Pd), rhodium (Rh) or other suitable oxidizing catalysts, or combination thereof. The OC device 18 is useful in treating unburned gaseous and non-volatile HC and CO emitted from the engine 12 as part of the exhaust gas 16 and which are oxidized in an exothermic reaction to form carbon dioxide and water.

In an exemplary embodiment, a Selective Catalytic Reduction ("SCR") device 38 is disposed downstream of the OC device 18. In a manner similar to the OC device, the SCR device 38 may include a flow-through ceramic or metal monolith substrate ("substrate") 40 that is packaged in a rigid shell or canister 42 having an inlet and an outlet in fluid communication with exhaust gas conduit 14 and configured to facilitate the flow of exhaust gas 16 therethrough. The substrate 40 has an SCR catalyst composition 44 applied thereto. The SCR catalyst composition may contain a zeolite and one or more base metal components such as iron ("Fe"), cobalt ("Co"), copper ("Cu") or vanadium ("V") which can operate efficiently to convert NOx constituents in the exhaust gas 16 in the presence of a reductant such as ammonia ('NH$_3$") at "active" temperatures that are in the range of 200° C. and above. When operating temperatures of the SCR device 38 are below active operating temperatures, untreated exhaust gas 16 (i.e. excess NOx) can bypass the device and be emitted from the exhaust gas after treatment system 10.

In an exemplary embodiment, the NH$_3$ reductant 48 may be injected into the exhaust gas conduit 14 at a location upstream of the SCR device 38 using a reductant injector 54 that is in fluid communication with exhaust gas conduit 14; or other suitable method of delivery of the reductant to the exhaust gas 16. The reductant may be in the form of a gas, a liquid or an aqueous urea solution and may be mixed with air in the reductant injector 54 to aid in the dispersion of the injected spray in the exhaust gas 16. Similarly, disposed upstream of the OC device 18, in fluid communication with the exhaust gas 16 in the exhaust gas conduit 14 may be a fuel injector 58. The fuel injector 58 is configured to introduce unburned fuel ("HC") 60 into the exhaust gas stream for delivery to the OC device 18 during certain operating conditions of the exhaust gas treatment system 10, to be described herein. Other methods for introducing excess HC into the exhaust gas 16 may be used such as late injection of fuel into the engine cylinders which results in excess unburned fuel exiting the cylinders as a component of the exhaust gas 16.

Disposed upstream of the SCR device 38, between the SCR device and the OC device 18 is a NOx adsorber assembly 68. The NOx adsorber assembly 68 may be housed in its own canister or, as illustrated in FIG. 1, it may be disposed in the canister 42 of the SCR device 38 thereby reducing the number of individual exhaust treatment devices which must be packaged in limited packaging space, in the case of vehicle applications of the internal combustion engine 12. In an exemplary embodiment, the NOx adsorber assembly 68 may comprise a cylindrical substrate 70 that extends radially inwardly from the inner wall 46 of the shell or canister 42 to define axially extending flow passages (not shown) in the substrate and an axially extending through-passage or exhaust gas bypass 72 extending centrally thereof. A valve assembly 75 is disposed in fluid communication with the axially extending through-passage or exhaust gas bypass 72 of the cylindrical substrate 70 and is operable to move to a closed position (shown in FIG. 1) in which exhaust gas 16 is prevented from flowing through the through-passage 72 and is forced to flow through the flow passages of cylindrical substrate 70 and to the SCR device 38, as well as to an open (or partially open) position (not shown) in which exhaust gas 16 flows through the through-passage or exhaust gas bypass 72 and to the SCR device 38. In the open position, the exhaust gas 16 will not flow through (or will partially flow through) the cylindrical substrate 70 due to the higher flow restriction presented by the substrate and will flow primarily through the through-passage 72 and to the SCR device 38. While the NOx adsorber assembly illustrated 68 illustrated in FIG. 1, illustrates the use of a cylindrical substrate 70 having an axially extending through-passage or bypass 72, this configuration is only exemplary in nature and configuration and it should be clear to one skilled in the art that packaging and performance requirements may necessitate other configurations for both the substrate and the exhaust gas bypass 72.

In an exemplary embodiment, the cylindrical substrate 70 of the NOx adsorber assembly 68 has an adsorbent compound 76, such as zeolite, applied thereto. The adsorbent compound 76 is selected to temporarily entrain NOx constituents from the exhaust gas 16 during periods when the SCR device 38 has not attained a suitable operating temperature (or has fallen below that temperature). Such an adsorbent 76 is known to have a limited NOx storage capacity and NOx storage temperature range and must be purged once it reaches its storage limits and prior to re-use.

A controller such as an engine, a powertrain or a vehicle controller 78 is operably connected to, and monitors, the exhaust gas treatment system 10 through signal communication with a number of sensors such as first and second temperature sensors 80 and 82, respectively. First temperature sensor 80 monitors the temperature near the outlet of the OC device 18 and second temperature sensor 82 monitors the temperature upstream of the SCR device 38, between the SCR device and the NOx adsorber assembly 68. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

Figure 2:
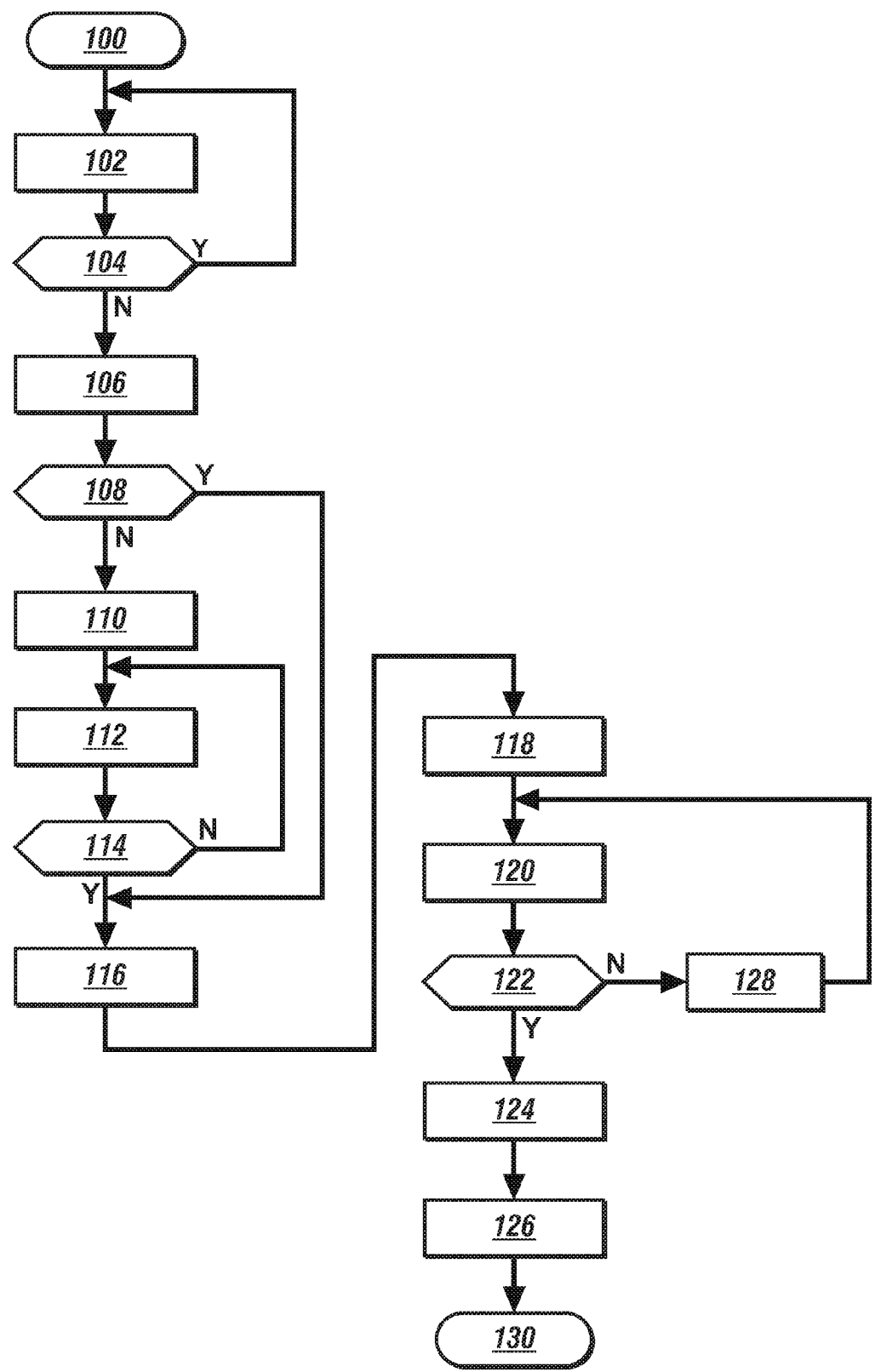
FIG. 2 is an operational diagram illustrating an exemplary operating mode of a portion of the exhaust gas treatment system embodying aspects of the invention.

Referring to FIGS. 1 and 2, an exemplary mode of operation of the exhaust gas treatment system 10 will now be described. The mode of operation is particularly applicable following cold start of the internal combustion engine 12 but may also be useful during operation of the internal combustion engine at times when the SCR device 38 drops below a minimum operating temperature. Such occasions may include the use of the internal combustion engine 12 as part of a hybrid-electric vehicle system when frequent shut-down of the engine occurs, such as in stop-and-go city driving.

In an exemplary embodiment, the mode of operation begins at 100. The controller 78 accesses temperature information regarding the SCR device 38 from the second temperature sensor 82 at 102. If the SCR device 38 is at or above its operating temperature at 104 the operation may end or return to step 102. If the SCR device has not reached, or has dropped below a minimum operating temperature at 104 the controller accesses temperature information regarding the OC device 18 from the first temperature sensor 80 at 106. The controller determines, at 108 if the OC device 18 is at a minimum operating temperature that is necessary to deliver sufficient heat through the exhaust gas 16 to the SCR device 38 to raise the SCR device to its minimum operating temperature. If the OC device 18 is below a minimum operating temperature that is necessary to deliver sufficient heat through the exhaust gas 16 to the SCR device 38 to raise the SCR device to its minimum operating temperature the controller will command the valve assembly 75 to a closed position at 110 to thereby force the exhaust gas 16 through the cylindrical substrate 70 for the adsorption of NOx therefrom. Concurrent with the closure of the valve assembly 75 at 110, the controller will activate the fuel injector 58 to deliver fuel ("HC") 60 into the exhaust gas 16 upstream of the OC device

18. The injected fuel 60 will oxidize when it passes through the OC device 18 and the exothermic reaction will rapidly raise the temperature of the exhaust gas 16. The controller will monitor the temperature of the exhaust gas 16 through first temperature sensor 80 at 112. When the temperature of the exhaust gas 16 has been elevated to a level that is sufficient to rapidly warm the SCR device 38 to a minimum operating temperature at 114 the controller will command the valve assembly 75 to an open position at 116, to thereby allow the heated exhaust gas 16 to bypass the cylindrical substrate 70 and flow directly through the axially extending through-passage or exhaust gas bypass 72 and to the SCR device 38 where it will raise the temperature of the SCR device 38 to an operational temperature.

Upon activation of the SCR device 38 as determined by the controller at 118 through monitoring the temperature sensor 82, the fuel injector 58 may be de-activated and the reductant injector 54 may be activated at 118. Following activation of the reductant injector 54 which will result in full operation of the SCR device 38, the controller will again determine at 120 if the temperature of the exhaust gas exiting the OC 18 is at a level that is sufficient to regenerate or de-sorb NOx constituents that have been adsorbed by the adsorbent compound 76 on the cylindrical substrate 70 of the NOx adsorber assembly 68 at 122. If such is the case, the controller 78 will close the valve assembly 75 at 124, forcing the exhaust gas 16 through the cylindrical substrate 70 where it will de-sorb the entrained NOx and transport it to the SCR device 38 for reduction therein. If, at 122, the controller determines that the exhaust temperature exiting the OC device 18 is not at a temperature level sufficient to de-sorb NOx from the NOx adsorber assembly 68, it will reactivate the fuel injector 58 at 128 to deliver fuel to the OC device 18, thereby raising the exhaust gas temperature 16 exiting the OC device to a level that is sufficient to de-sorb the NOx from the NOx adsorber assembly 68 prior to closing the valve assembly 75 at 124. Following a predetermined time or other set parameter for determining the full desorption of NOx from the NOx adsorber assembly 68, the controller 78 will command the valve assembly 75 to the open position at 126 and exhaust gas 16 will flow through the exhaust passage 72 or exhaust gas bypass and to the SCR 38. The operational mode of the exhaust gas treatment system will end at 130.

While the mode of operation described has been done so in its entirety, it should be noted and is contemplated that certain steps may be taken out of order or not at all depending on the status of any particular exhaust treatment device or the temperature of the exhaust gas 16 in the exhaust treatment system 10 at any given time.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. An exhaust gas after treatment system for an internal combustion engine comprising:
    an exhaust gas conduit configured to transport exhaust gas from the internal combustion engine to exhaust treatment devices of the exhaust gas treatment system;
    an oxidation catalyst device configured to oxidize unburned gaseous and non-volatile HC and CO in the exhaust gas;
    a selective catalytic reduction device disposed downstream of the oxidation catalyst device configured to convert NOx constituents in the exhaust gas, in the presence of a reductant, within an active temperature range;
    a NOx adsorber assembly disposed upstream of the selective catalytic reduction device, between the selective catalytic reduction device and the oxidation catalyst device, comprising:
        a cylindrical substrate defining flow passages having an adsorbent compound applied thereto to entrain NOx constituents from the exhaust gas, the cylindrical substrate having a tubular shape defining an exhaust bypass extending therethrough; and
        a valve assembly disposed in fluid communication with the exhaust bypass and operable to move from an open position in which exhaust gas flows through the exhaust bypass and to the selective catalytic reduction device to a closed position in which exhaust gas is prevented from flowing through the bypass and is forced to flow through the exhaust passages and to the selective catalytic reduction device; and
    a controller in signal communication with the exhaust gas aftertreatment system and configured to monitor the temperature of the selective catalytic reduction device, wherein the controller is operable to move the valve assembly to the open position when the selective catalytic reduction device is at or above an operating temperature and to move the valve assembly to a closed position when the selective catalytic reduction device is below the operating temperature for entrainment of NOx constituents from the exhaust gas.

2. The exhaust gas aftertreatment system of claim 1, further comprising:
    a first temperature sensor located near the outlet of the oxidation catalyst device in signal communication with the controller and a second temperature sensor located near the inlet of the selective catalytic reduction device in signal communication with the controller; the second temperature sensor operable to signal the controller to move the valve assembly from the open to the closed position and from the closed to the open position relative to the exhaust bypass.

3. The exhaust gas aftertreatment system of claim 2, further comprising:
    a hydrocarbon injector in signal communication with the controller and operable, based on signals from the first and the second temperature sensors, to deliver hydrocarbon to the exhaust gas, upstream of the oxidation catalyst device for oxidation therein, to thereby increase the temperature of the exhaust gas passing therethrough, when the temperature of the selective catalytic reduction device is below the operating temperature and when the temperature of the exhaust gas is below a temperature required to de-sorb NOx from the NOx adsorber assembly prior to opening moving the valve assembly, from the closed to the open position relative to the exhaust bypass.

4. The exhaust gas aftertreatment system of claim 2, further comprising:
    a reductant injector in signal communication with the controller and operable based on signals therefrom to deliver reductant to the exhaust gas, upstream of the selective catalyst device, to reduce NOx from the exhaust gas when the temperature of the selective catalytic reduction device is at or above the operating temperature and when the valve is in the open position relative to the exhaust bypass.

5. The exhaust gas aftertreatment system of claim 1, wherein the cylindrical substrate extends partially radially inwardly from an inner wall of an assembly canister to define the flow passages having the adsorbent compound applied thereto to entrain NOx constituents from the exhaust gas and, the exhaust bypass, and wherein the valve assembly is disposed in fluid communication with the exhaust bypass and operable to move from the open position in which exhaust gas flows through the exhaust bypass and to the selective catalytic reduction device to the closed position in which exhaust gas is prevented from flowing through the exhaust bypass and is forced to flow through the flow passages of the cylindrical substrate and to the selective catalytic reduction device.

6. A method of operation of an exhaust gas treatment system comprising an exhaust gas conduit configured to transport exhaust gas from an internal combustion engine to exhaust treatment devices of the exhaust gas treatment system, an oxidation catalyst device configured to oxidize unburned gaseous and non-volatile HC and CO in the exhaust gas, a selective catalytic reduction device disposed downstream of the oxidation catalyst device and configured to convert NOx constituents in the exhaust gas in the presence of a reductant within an active temperature range, a NOx adsorber assembly disposed upstream of the selective catalytic reduction device, between the selective catalytic reduction device and the oxidation catalyst device the NOx adsorber assembly including a substrate defining flow passages having an adsorbent compound applied thereto to entrain NOx constituents from the exhaust gas, an exhaust bypass and a valve assembly disposed in fluid communication with the exhaust bypass and operable to move from an open position in which exhaust gas flows therethrough and to the selective catalytic reduction device to a closed position in which exhaust gas is prevented from flowing therethrough and is forced to flow through the flow passages of the substrate and to the selective catalytic reduction device, the exhaust gas treatment system further comprising a controller in signal communication with the exhaust gas aftertreatment system and configured to monitor the temperature of the selective catalytic reduction device, wherein the controller is operable to move the valve assembly to the open position when the selective catalytic reduction device is at or above an operating temperature and to move the valve assembly to a closed position when the selective catalytic reduction device is below the operating temperature for entrainment of NOx constituents from the exhaust gas, the method comprising:
  accessing, with the controller, the temperature of the selective catalyst device;
  if the selective catalyst device has not reached, or has dropped below a minimum operating temperature, accessing, with the controller, the temperature of the oxidation catalyst device;
  determining, with the controller, if the oxidation catalyst device is at a minimum operating temperature necessary to deliver sufficient heat through the exhaust gas to the selective catalyst device to raise the selective catalyst device to its minimum operating temperature;
  if the oxidation catalyst device is below its minimum operating temperature, commanding, with the controller the valve assembly to a closed position to thereby force the exhaust gas through the substrate for the adsorption of NOx therefrom;
  concurrent with the closure of the valve assembly, activating a fuel injector to deliver fuel into the exhaust gas upstream of the oxidation catalyst device to raise the temperature of the oxidation catalyst device and temperature of the exhaust gas by;
  monitoring, with the controller, the temperature of the exhaust gas;
  when the temperature of the exhaust gas has been elevated to a level that is sufficient to warm the selective catalyst device to a minimum operating temperature, commanding, with the controller, the valve assembly to an open position to thereby allow the heated exhaust gas to bypass the substrate and flow directly through the exhaust gas bypass and to the selective catalyst device where it will operate to raise the temperature of the selective catalyst device to an operational temperature;
  determining with the controller, if the temperature of the exhaust as exiting the oxidation catalyst device is at a level that is sufficient to regenerate the NOx adsorber; and
  reactivating the fuel injector to deliver fuel into the exhaust gas upstream of the oxidation catalyst device if the controller determines that the temperature of the exhaust gas exiting the oxidation catalyst device is not at a level that is sufficient to regenerate the NOx adsorber.

7. A method of operation of the exhaust gas treatment system of claim 6, the method further comprising:
  following activation of the selective catalyst device the controller will again determine if the temperature of the exhaust gas exiting the oxidation catalyst is sufficient to de-sorb NOx constituents that have been adsorbed by the adsorbent compound in the substrate of the NOx adsorber assembly; and
  if the exhaust temperature is sufficient, the controller will close the valve assembly forcing the exhaust gas through the substrate where it will de-sorb the entrained NOx and transport it to the selective catalyst device for reduction therein.

8. A method of operation of the exhaust gas treatment system comprising an exhaust gas conduit configured to transport exhaust gas from the internal combustion engine to exhaust treatment devices of the exhaust gas treatment system, an oxidation catalyst device configured to oxidize unburned gaseous and non-volatile HC and CO in the exhaust gas, a selective catalytic reduction device disposed downstream of the oxidation catalyst device configured to convert NOx constituents in the exhaust gas in the presence of a reductant within an active temperature range, a NOx adsorber assembly disposed upstream of the selective catalytic reduction device, between the selective catalytic reduction device and the oxidation catalyst device the NOx adsorber assembly including a substrate defining flow passages having an adsorbent compound applied thereto to entrain NOx constituents from the exhaust gas, an exhaust bypass and a valve assembly disposed in fluid communication therewith and operable to move from an open position in which exhaust gas flows through the exhaust bypass and to the selective catalytic reduction device to a closed position in which exhaust gas is prevented from flowing through the exhaust bypass and is forced to flow through the flow passages of the substrate and to the selective catalytic reduction device, the exhaust gas treatment system further comprising a controller in signal communication with the exhaust gas aftertreatment system and configured to monitor the temperature of the selective catalytic reduction device, wherein the controller is operable to move the valve assembly to the open position when the selective catalytic reduction device is at or above an operating temperature and to move the valve assembly to a closed position when the selective catalytic reduction device is below the operating temperature for entrainment of NOx constituents from the exhaust gas, the method comprising:

accessing, with the controller, the temperature of the selective catalyst device;

if the selective catalyst device has not reached, or has dropped below a minimum operating temperature, accessing, with the controller, the temperature of the oxidation catalyst device;

determining, with the controller, if the oxidation catalyst device is at a minimum operating temperature necessary to deliver sufficient heat through the exhaust gas to the selective catalyst device to raise the selective catalyst device to its minimum operating temperature;

if the oxidation catalyst device is below its minimum operating temperature, commanding, with the controller, the valve assembly to a closed position to thereby force the exhaust gas through the substrate for the adsorption of NOx therefrom;

concurrent with the closure of the valve assembly, activating a fuel injector to deliver fuel into the exhaust gas upstream of the oxidation catalyst device to raise the temperature of the oxidation catalyst device and temperature of the exhaust gas;

monitoring, with the controller, the temperature of the exhaust gas and when the temperature of the exhaust gas has been elevated to a level that is sufficient to warm the selective catalyst device to a minimum operating temperature, commanding, with the controller, the valve assembly to an open position to thereby allow the heated exhaust gas to bypass the substrate and flow directly through the exhaust gas bypass and to the selective catalyst device where it will operate to raise the temperature of the selective catalyst device to an operational temperature;

following activation of the selective catalyst device, determining, with the controller, if the temperature of the exhaust gas exiting the oxidation catalyst is sufficient to regenerate the adsorbent compound in the substrate of the NOx adsorber assembly;

following determining if the temperature of the exhaust gas exiting the oxidation catalyst is sufficient, if the exhaust temperature is sufficient, closing , with the controller, the valve assembly forcing the exhaust gas through the substrate where it will de-sorb the entrained NOx and transport it to the selective catalyst device for reduction therein;

following determining if the temperature of the exhaust as exiting the oxidation catalyst is sufficient, if the exhaust temperature is insufficient, reactivating the fuel injector to deliver fuel into the exhaust gas upstream of the oxidation catalyst device;

determining whether the NOx adsorber assembly is fully desorbed of NOx; and following determining the full desorption of NOx from the NOx adsorber assembly, commanding, with the controller, the valve assembly to the open position and exhaust gas will flow through the exhaust gas bypass and to the selective catalyst device.

9. The exhaust gas aftertreatment system of claim 1, the selective catalytic reduction device is disposed directly downstream of the NOx adsorber assembly.

10. The exhaust gas aftertreatment system of claim 1, further comprising a temperature sensor located directly downstream of the oxidation catalyst, the temperature sensor extending at least partially through the exhaust gas conduit.

11. The exhaust gas aftertreatment system of claim 10, further comprising a reductant injector in flow communication with the exhaust gas conduit directly downstream of the temperature sensor and directly upstream of the NOx adsorber assembly.

12. The exhaust gas aftertreatment system of claim 1, wherein the oxidation catalyst device comprises a first canister, and the selective catalytic reduction device comprises a second canister separate from the first canister, wherein the second canister houses the NOx adsorber assembly.

* * * * *